United States Patent
Tanaka et al.

(10) Patent No.: US 9,866,402 B2
(45) Date of Patent: Jan. 9, 2018

(54) REMOTE CARE SYSTEM FOR APARTMENT BUILDING AND REMOTE MONITORING APPARATUS USED THEREIN

(71) Applicant: Panasonic Intellectual Property Management Co., Ltd., Osaka (JP)

(72) Inventors: Toshiaki Tanaka, Kyoto (JP); Masaru Yamaoka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/183,937

(22) Filed: Jun. 16, 2016

(65) Prior Publication Data
US 2016/0380782 A1     Dec. 29, 2016

(30) Foreign Application Priority Data
Jun. 24, 2015   (JP) ................. 2015-126175

(51) Int. Cl.
G08C 19/22    (2006.01)
H04L 12/28    (2006.01)
H04Q 9/00     (2006.01)
G08C 17/02    (2006.01)

(52) U.S. Cl.
CPC .......... *H04L 12/2823* (2013.01); *G08C 17/02* (2013.01); *H04L 12/2818* (2013.01); *H04Q 9/00* (2013.01)

(58) Field of Classification Search
CPC .... H04L 12/2823; H04L 12/2818; H04Q 9/00
USPC ....... 340/870.07, 438, 517, 522, 541, 573.1; 700/12, 90, 275, 276, 277, 278; 715/736, 715/764, 771
See application file for complete search history.

(56) References Cited

U.S. PATENT DOCUMENTS

| | | | | |
|---|---|---|---|---|
| 2006/0055543 | A1* | 3/2006 | Ganesh | G08B 21/0423 340/573.1 |
| 2007/0073555 | A1* | 3/2007 | Buist | G06F 19/322 705/2 |
| 2012/0253527 | A1* | 10/2012 | Hietala | G05B 17/02 700/278 |
| 2014/0207292 | A1* | 7/2014 | Ramagem | G05B 15/02 700/278 |
| 2015/0285526 | A1* | 10/2015 | Smith | F24F 11/006 700/276 |
| 2015/0319046 | A1* | 11/2015 | Plummer | H04L 41/22 715/736 |

(Continued)

FOREIGN PATENT DOCUMENTS

JP    2010-071595    4/2010

*Primary Examiner* — Dhaval Patel
(74) *Attorney, Agent, or Firm* — Brinks Gilson & Lione

(57) ABSTRACT

A remote care system for an apartment building includes: a home electric appliance installed in a housing unit structuring an apartment building; a sensor that is provided in the home electric appliance and senses the behavior of a resident in the housing unit; and a remote monitoring apparatus that remotely controls the home electric appliance installed in each of a plurality of housing units based on sensing information transmitted from the sensor. This realizes implementation and operation of a remote care system for an apartment building using a major appliance used in ordinary households.

15 Claims, 7 Drawing Sheets

(56) References Cited

U.S. PATENT DOCUMENTS

| | | | |
|---|---|---|---|
| 2016/0209072 A1* | 7/2016 | Golden | F24F 11/0034 |
| 2016/0260320 A1* | 9/2016 | Fadell | G08C 17/02 |

* cited by examiner

FIG. 5

ROOM INFORMATION OF MS. X                          AUTOMATIC CONTROL MODE

| TIME POINT | 9:00 | 9:30 | 10:00 | 10:30 | 11:00 | 11:30 | 12:00 | ... |
|---|---|---|---|---|---|---|---|---|
| INDOOR TEMPERATURE(°C) | 26.5 | 26.7 | 26.3 | 26.5 | 26.4 | 26.3 | 26.7 | ... |
| INDOOR HUMIDITY(%) | 40 | 41 | 42 | 41 | 40 | 40 | 45 | ... |
| OUTSIDE TEMPERATURE(°C) | 34.8 | 36.1 | 36.8 | 37.2 | 37.8 | 38.4 | 40.2 | ... |
| SET TEMPERATURE(°C) | 26.3 | 26.3 | 26.3 | 26.3 | 26.3 | 26.3 | 26.3 | ... |
| ELECTRICITY CHARGE (CUMULATIVE) | 1050 | 1054 | 1060 | 1065 | 1069 | 1074 | 1079 | ... |
| ABNORMALITY | No | No | No | No | No | No | No | ... |
| MOTION SENSOR VALUE (LEVEL VALUE) | 3 | 2 | 2 | 2 | 3 | 2 | 3 | ... |

(OWNED HOME ELECTRIC APPLIANCE INFORMATION)
· AIR CONDITIONER MANUFACTURED BY COMPANY Q AB-CCD010
· INSTALLED BY WINDOW, EXPOSED TO MORNING SUNSHINE (SENSOR INFORMATION)
· NUMBER OF SENSORS 3

(USER INFORMATION)
· WOMAN AGE 82
· SENSITIVE TO COLD, THEREFORE TEMPERATURE MUST BE CONTROLLED SO AS NOT TO BE SET TO 25°C OR LOWER (ACTION BUTTONS)

[ ON ]   [ OFF ]

[ TEMPERATURE↑ ]   [ TEMPERATURE↓ ]

[ ALERT ]

FIG. 6

ROOM INFORMATION OF MR. Y                    AUTOMATIC CONTROL MODE

| TIME POINT | 13:00 | 13:30 | 14:00 | 14:30 |
|---|---|---|---|---|
| INDOOR TEMPERATURE(°C) | 23.5 | 23.7 | 24.3 | 25.0 |
| INDOOR HUMIDITY(%) | 40 | 41 | 40 | 39 |
| OUTSIDE TEMPERATURE(°C) | 40.8 | 41.4 | 41.8 | 42.3 |
| SET TEMPERATURE(°C) | 23 | 23 | 23 | 23 |
| ELECTRICITY CHARGE (CUMULATIVE) | 2050 | 2060 | 2073 | 2080 |
| ABNORMALITY | No | No | No | No |
| MOTION SENSOR VALUE (LEVEL VALUE) | 3 | 3 | 3 | 4 |

(OWNED HOME ELECTRIC APPLIANCE INFORMATION)
・AIR CONDITIONER MANUFACTURED
  BY COMPANY R EF-GHY021
・INSTALLED AT CENTER OF ROOM
・ROOM ON WEST SIDE,
EXPOSED TO AFTERNOON SUNSHINE (SENSOR INFORMATION)
・NUMBER OF SENSORS 3

(USER INFORMATION)
・MAN AGE 87
・SENSITIVE TO HEAT, THEREFORE TEMPERATURE MUST BE
CONTROLLED SO AS TO BE SET TO 24°C OR LOWER (ACTION BUTTONS)

[ON]  [OFF]

[TEMPERATURE↑]  [TEMPERATURE↓]

[ALERT]

FIG. 7

| RESIDENT | CARE DEGREE | PERMISSIBLE TEMPERATURE RANGE(°C) | PERMISSIBLE SENSING TIME (MINUTE) | PRIORITY | |
|---|---|---|---|---|---|
| ROOM NO. 101 MR./MS. A | REQUIRING LONG-TERM CARE 5 | 18-28 | 10 | 1 | ... |
| ROOM NO. 102 MR./MS. B | REQUIRING LONG-TERM CARE 2 | 16-30 | 60 | 2 | ... |
| ROOM NO. 103 MR./MS. C | REQUIRING SUPPORT | NONE | NONE | 3 | ... |
| ... | ... | ... | ... | ... | ... |

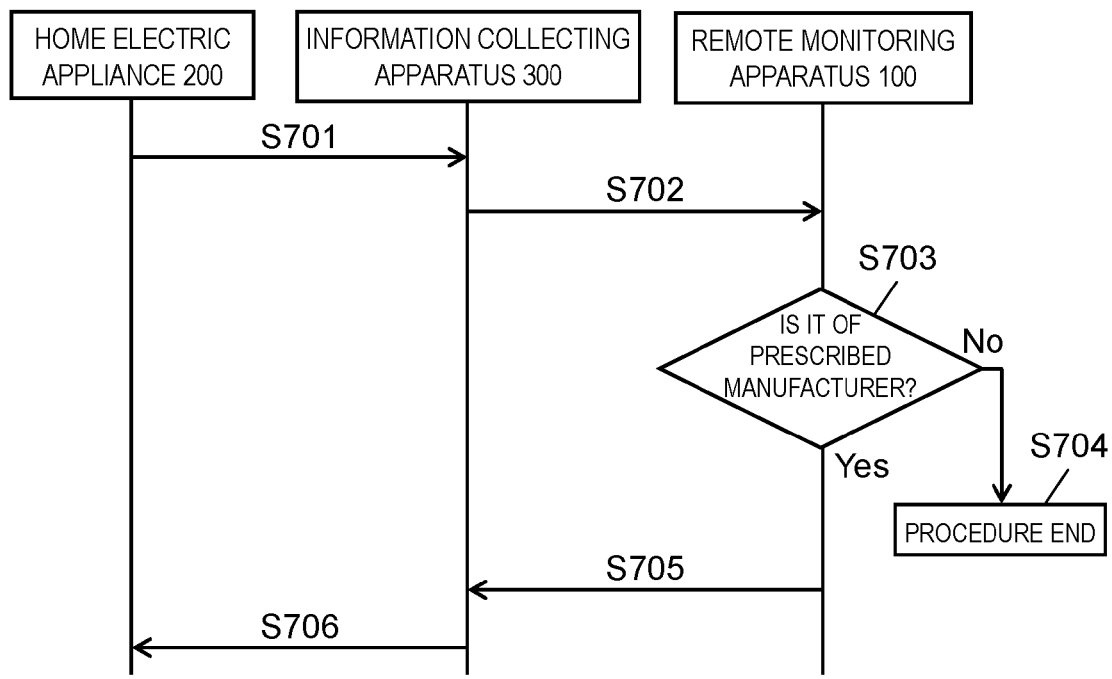
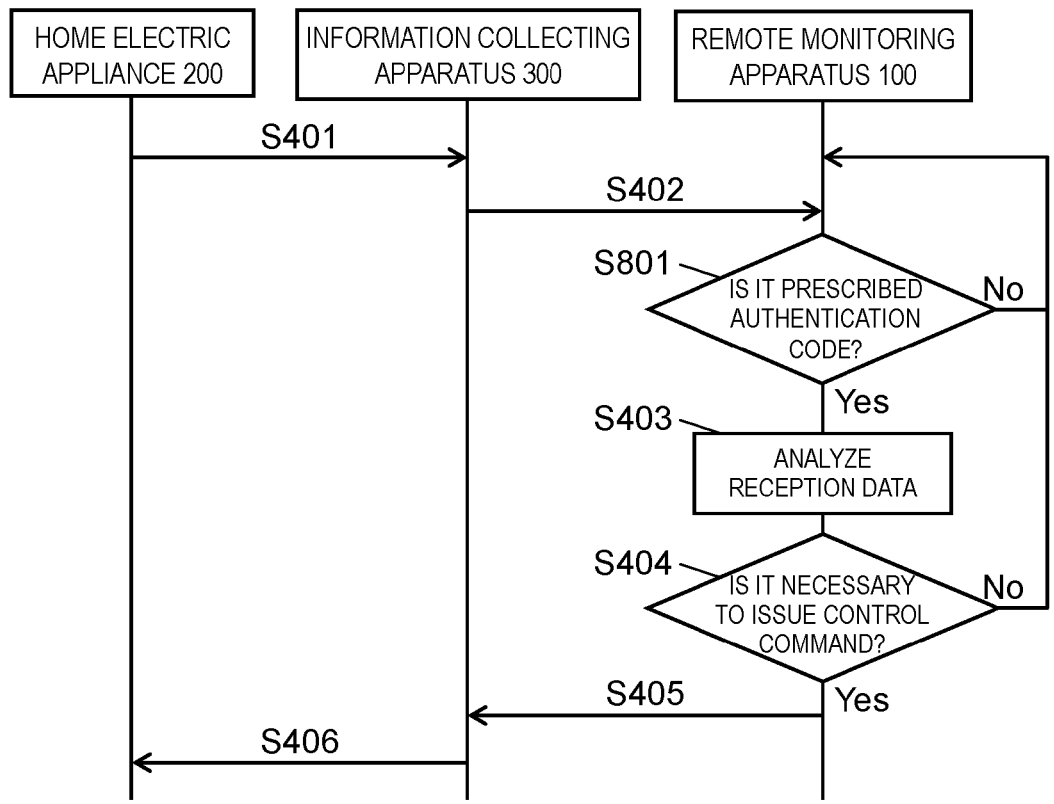

REMOTE CARE SYSTEM FOR APARTMENT BUILDING AND REMOTE MONITORING APPARATUS USED THEREIN

BACKGROUND

1. Technical Field

The present disclosure relates to a remote care system for an apartment building and a remote monitoring apparatus used in the remote care system.

2. Description of the Related Art

Recently, major appliances such as air conditioners have been increasingly sophisticated. For example, an air conditioner captures the position or movement of a person with built-in imager or motion sensor, and controls the air condition to be suitable for the person's condition. Further, the air conditioner uses the motion sensor for sensing entry of any suspicious person, and for watching over children or pets. For example, Unexamined Japanese Patent Publication No. 2010-071595 (hereinafter referred to as "Patent Literature 1") discloses a major appliance having the above-described functions.

Further, the recent increase in the number of elderly people who live alone requires popularization of remote care systems for watching over such elderly people. The remote care systems are implemented in various modes. For example, there is provided a remote care system in which information from a sensor built in a major appliance, which is used in ordinary households and therefore familiar to an elderly person, is used for watching over the elderly person. In this manner, the elderly person being watched over becomes less conscious of being monitored. Further, the remote care system optimally controls the major appliance according to the condition of the elderly person. As a result, the remote care system comfortable for elderly people is provided.

However, how to implement and operate a remote care system for an apartment building using major appliances is not commonly known.

SUMMARY

The present disclosure provides a remote care system for an apartment building for implementing and operating a remote care system using major appliances used in ordinary households, and a remote monitoring apparatus used in the remote care system.

That is, the remote care system for an apartment building of the present disclosure includes: a home electric appliance installed in a housing unit structuring an apartment building; a sensor that is built in the home electric appliance and senses a condition of a resident in the housing unit; and a remote monitoring apparatus that remotely controls the home electric appliance installed in each of a plurality of the housing units, based on sensing information transmitted from the sensor.

Thus, the person being watched over becomes less conscious of being monitored. As a result, a remote care system for an apartment building that provides a comfortable residential environment for a person being watched over can be provided.

BRIEF DESCRIPTION OF THE DRAWINGS

FIG. 5 is a diagram showing an exemplary display with the remote monitoring apparatus according to the first exemplary embodiment;

FIG. 6 is a diagram showing another exemplary display with the remote monitoring apparatus according to the first exemplary embodiment;

FIG. 7 is a diagram showing an exemplary table associating user information and alert level with each other according to the first exemplary embodiment;

FIG. 8 is a sequence diagram relating to a remote care system for an apartment building according to a second exemplary embodiment of the present disclosure;

FIG. 9 is a sequence diagram relating to the remote care system for an apartment building according to the second exemplary embodiment.

DETAILED DESCRIPTION

Hereinafter, a description will be given of embodiments of the present disclosure with reference to the drawings. Note that, the embodiments do not limit the present disclosure.

First Exemplary Embodiment

Firstly, with reference to FIG. 1, a description will be given of a remote care system for an apartment building according to a first exemplary embodiment.

Figure 1:
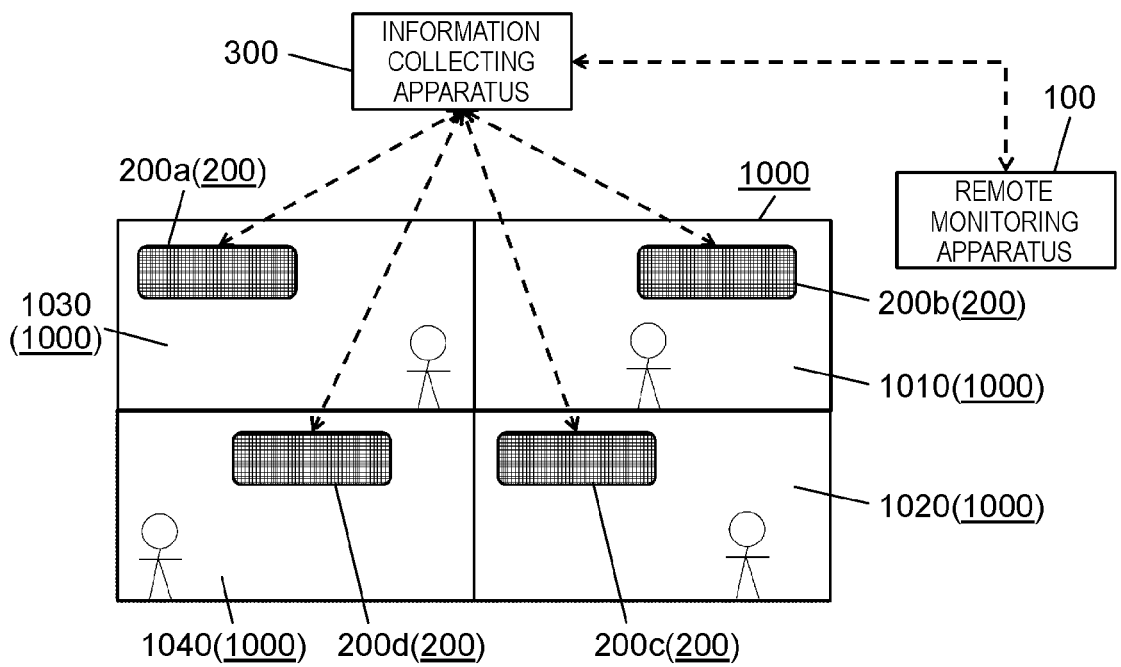
FIG. 1 is a diagram showing the overall structure of a remote care system for an apartment building according to a first exemplary embodiment of the present disclosure.

FIG. 1 is a diagram showing the overall structure of the remote care system for an apartment building according to the first exemplary embodiment.

As shown in FIG. 1, the remote care system for an apartment building according to the present exemplary embodiment is structured by remote monitoring apparatus 100, home electric appliances 200 installed in apartment building 1000, information collecting apparatus 300 and the like. Home electric appliance 200 may be what is called a major appliance such as an air conditioner, a refrigerator, a washing machine, a rice cooker or the like.

In the following, a description will be given of a case where apartment building 1000 is structured by, for example, four housing units 1010, 1020, 1030, 1040. In this case, as home electric appliances 200, for example, major appliances 200a, 200b, 200c, 200d respectively corresponding to housing units 1010, 1020, 1030, 1040 are installed.

Remote monitoring apparatus 100 is implemented by, for example, a server, a personal computer and the like. Remote monitoring apparatus 100 receives various kinds of information having transmitted from home electric appliances 200 via information collecting apparatus 300. Then, remote monitoring apparatus 100 analyzes the reception data. Further, remote monitoring apparatus 100 transmits a control command to any corresponding home electric appliance 200, to thereby remotely control that home electric appliance 200.

Information collecting apparatus 300 functions as a relaying apparatus that communicates with home electric appliances 200 to exchange various kinds of information. Note that, the communication may be wired or wireless, and is not limited to a specific communication method.

The foregoing is the structure of the remote care system for an apartment building according to the present exemplary embodiment.

In the following, with reference to FIG. 2, a description will be given of the structure of remote monitoring apparatus 100 used in the remote care system for an apartment building.

Figure 2:
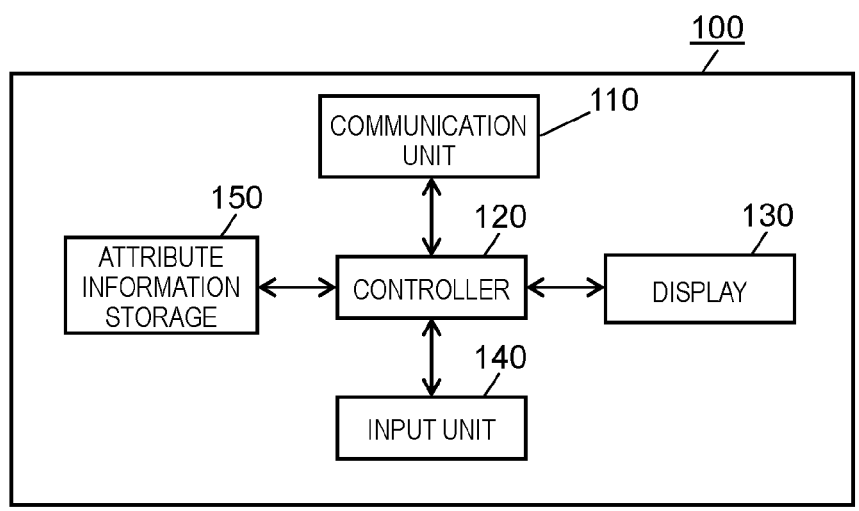
FIG. 2 is a block diagram showing the structure of the remote monitoring apparatus according to the first exemplary embodiment.

FIG. 2 is a block diagram showing the internal structure of remote monitoring apparatus 100.

As shown in FIG. 2, remote monitoring apparatus 100 includes communication unit 110, controller 120, display 130, input unit 140, and attribute information storage 150.

Communication unit 110 communicates with information collecting apparatus 300 to exchange various kinds of information. Note that, similarly to information collecting apparatus 300, the communication may be wired or wireless, and is not limited to a particular communication method.

Controller 120 performs operations on data received at communication unit 110 via information collecting apparatus 300. Controller 120 displays the operated data on display 130, which is, for example, a liquid crystal display. Further, controller 120 receives input information entered via input unit 140, which is, for example, a keyboard and a mouse. Controller 120 performs operations on the received input information, and displays the operated data on display 130.

Attribute information storage 150 stores attribute information relating to each of housing units 1010, 1020, 1030, 1040. The attribute information relating to a housing unit specifically includes, for example, information on the installation place of a home electric appliance in the housing unit and information on the sunlight exposure of the housing unit. Further, the attribute information includes information on the performance of a home electric appliance installed in the housing unit and information on a resident of the housing unit. Note that, the attribute information may include sensing information obtained from a sensor built in a home electric appliance in the housing unit.

The foregoing is the structure of remote monitoring apparatus 100 used in the remote care system for an apartment building.

In the following, with reference to FIG. 3, a description will be given of the structure of home electric appliance 200 used in the remote care system for an apartment building.

Figure 3:
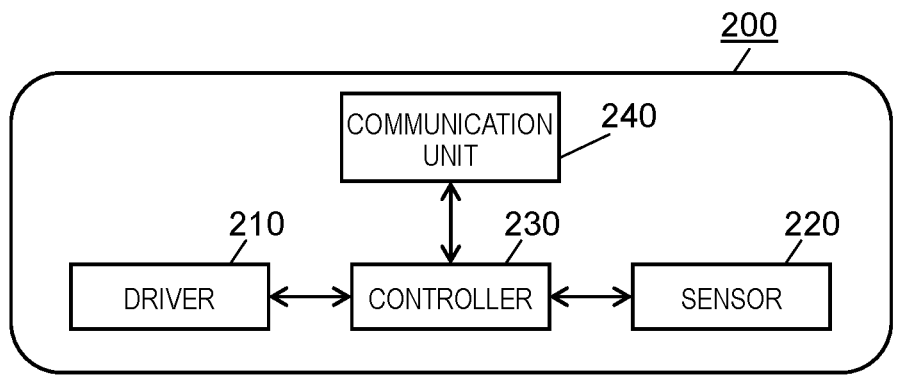
FIG. 3 is a block diagram showing the structure of a home electric appliance according to the first exemplary embodiment.

FIG. 3 is a block diagram showing the internal structure of home electric appliance 200.

As shown in FIG. 3, home electric appliance 200 has, in addition to its original functional elements, at least driver 210, sensor 220, controller 230, and communication unit 240.

Driver 210 carries out the original function of home electric appliance 200, in cooperation with original functional elements. Driver 210 performs main operations out of the original functions. For example, when home electric appliance 200 is an air conditioner, a compressor corresponds to driver 210. Further, when home electric appliance 200 is a rice cooker, a heater that heats a cooking vessel corresponds to driver 210.

Sensor 220 senses the presence or movement of a person in the housing unit where home electric appliance 200 incorporating that sensor 220 is installed. Note that, sensor 220 is implemented by, for example, an infrared sensor, an imaging camera, or an ultrasonic sensor.

Further, sensor 220 may sense the temperature and humidity in the housing unit, and the temperature outside the housing unit.

Upon sensor 220 sensing the presence or movement of a person, controller 230 transmits the information of the sensing (sensing information) to information collecting apparatus 300 via communication unit 240. Further, controller 230 transmits the temperature and humidity in the housing unit and the temperature outside the housing unit sensed by sensor 220 to information collecting apparatus 300 via communication unit 240. Further, controller 230 transmits setting information set to home electric appliance 200 to information collecting apparatus 300 via communication unit 240. Note that, the setting information is for example set temperature information, when home electric appliance 200 is an air conditioner.

Communication unit 240 communicates with information collecting apparatus 300 to exchange various kinds of information. Note that, the communication may be wired or wireless, and is not limited to a particular communication method. Further, communication unit 240 may not be built in home electric appliance 200, and may be provided independently of home electric appliance 200 so long as it is electrically connected to home electric appliance 200.

The foregoing is the structure of home electric appliance 200 used in the remote care system for an apartment building.

That is, the remote care system for an apartment building according to the present exemplary embodiment is capable of transmitting sensing information sensed by sensor 220 to information collecting apparatus 300. Then, information collecting apparatus 300 transmits the received sensing information to remote monitoring apparatus 100. This allows the operator of remote monitoring apparatus 100 to view, via display 130, information on presence/absence of a person in the housing unit, the temperature and the like. Further, the operator of remote monitoring apparatus 100 can watch over a person in each housing unit. Still further, remote monitoring apparatus 100 can properly control home electric appliance 200 by causing automatic or manual operations to make the person in the housing unit feel comfortable.

Next, with reference to FIG. 4, a description will be given of the implementation and operation of the remote care system for an apartment building according to the present exemplary embodiment.

Figure 4:
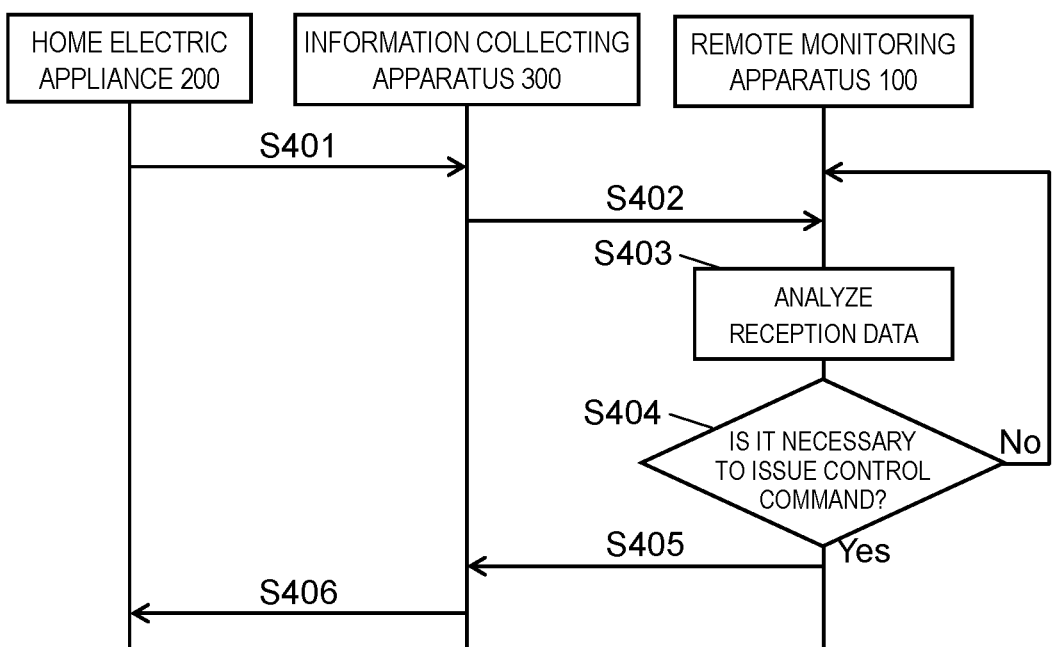
FIG. 4 is a sequence diagram relating to the remote care system for an apartment building according to the first exemplary embodiment.

FIG. 4 is a sequence diagram for describing the implementation and operation of the remote care system for an apartment building.

Firstly, home electric appliance 200 periodically transmits the following sensing information to information collecting apparatus 300 (Step S401). The sensing information is the information sensed by sensor 220 (for example, the presence or the condition such as movement of a person, the temperature and humidity in the housing unit, the temperature outside the housing unit), or the setting information set to home electric appliance 200.

Next, information collecting apparatus 300 relays the received sensing information to remote monitoring apparatus 100 (Step S402).

Next, remote monitoring apparatus 100 analyzes the reception data including the sensing information received from information collecting apparatus 300 (Step S403).

Here, firstly, with reference to FIGS. 5 and 6, a more detailed description will be given of the sensing information and the attribute information.

FIG. 5 is a diagram showing an exemplary display presented on display 130 of remote monitoring apparatus 100, listing the sensing information and the attribute information relating to the housing unit of a certain resident (Ms. X). FIG. 6 is a diagram showing an exemplary display listing the sensing information and the attribute information relating to the housing unit of other resident (Mr. Y). Note that, FIGS. 5 and 6 show the exemplary case where home electric appliance 200 is an air conditioner. Therefore, it goes without saying that the display content varies depending on home electric appliance 200.

As shown in FIGS. 5 and 6, display 130 displays the following sensing information in a time-series manner, for example on the upper part of the screen.

The sensing information is the indoor temperature, the indoor humidity, the outside temperature, and the setting state (the setting information set to home electric appliance 200) of the housing unit of the resident. Further, the sensing information is the electricity charge cumulative value of home electric appliance 200, occurrence of any abnormality, and the movement information of the person sensed by sensor 220 (the motion sensor value). Note that, in FIGS. 5 and 6, the motion sensor values are displayed in five levels. Specifically, level value 0 represents the state without any movement of the person, and level value 5 represents the state with active movement of the person.

Further, on display 130, the attribute information including owned home electric appliance information, sensor information, and user information, and action buttons are displayed on the lower part of the screen.

The owned home electric appliance information is information of home electric appliance 200 having sensor 220 and installed in the housing unit. The owned home electric appliance information includes, for example, the manufacturer, the product number, and the place where the home electric appliance is installed in the housing unit. Note that, the installation place information includes information relating to sunlight exposure of the housing unit, such as, "exposed to the morning sun", or "exposed to the afternoon sun".

The sensor information is information of sensor 220 in the housing unit, for example, the number of sensors. Note that, the sensor information may include, for example, the product number and performance information of sensor 220.

The user information includes the age of the resident of the housing unit, and the preference of the resident such as being sensitive to heat or sensitive to cold. The user information is displayed at the lowermost portion in the screen of display 130.

The action buttons are displayed on the lower right side in the screen. Operating the buttons issues control commands to home electric appliance 200. Similarly, the operator of remote monitoring apparatus 100 can provide control commands to home electric appliance 200 via input unit 140.

Further, display 130 displays "automatic control mode" or "manual control mode" at the upper right part of the screen. FIGS. 5 and 6 show the state where "automatic control mode" is displayed. "Automatic control mode" is the mode in which controller 120 determines operations of the action buttons without the need of the operator operating the action buttons. On the other hand, in "manual control mode", controller 120 does not determine operations of the action buttons and the operator must determine the operations by manipulating the action buttons.

In the foregoing manner, the sensing information and the attribute information are displayed on display 130 of remote monitoring apparatus 100.

Next, with reference to FIG. 6, a description will be given of analysis of reception data in Step S403.

FIG. 6 shows an exemplary display where remote monitoring apparatus 100 issues a control command of reducing the temperature to home electric appliance 200, based on the analysis result.

That is, FIG. 6 shows the state in the home unit where, for example from time point 13:00, the indoor temperature continuously rises in accordance with an increase in the outside temperature, reaching 25 degrees at time point 14:30.

Here, controller 120 ascertains that the resident is sensitive to heat and desires the indoor temperature environment of 24 degrees or lower, based on the user information of the attribute information stored in attribute information storage 150. Therefore, controller 120 changes the display manner of the action button "temperature ↓". Specifically, similarly to the case where the operator pushes the action button "temperature ↓" in the manual control mode, controller 120 displays the button in a color different from that of other action buttons.

Then, controller 120 transmits a control command of reducing the setting temperature to home electric appliance 200 (e.g., an air conditioner) via communication unit 110. Specifically, in the exemplary case shown in FIG. 6, controller 120 transmits a control command of changing the setting temperature from 23 degrees to 22 degrees to home electric appliance 200.

That is, as shown in FIG. 4, controller 120 of remote monitoring apparatus 100 determines whether or not to transmit (issue) a control command to corresponding home electric appliance 200 based on the analysis result of the reception data (Step S404). When controller 120 does not transmit a control command (No in Step S404), control returns to Step S403 and the subsequent steps are executed.

On the other hand, when it is necessary to transmit a control command (Yes in Step S404), controller 120 transmits a control command to information collecting apparatus 300 (Step S405).

The foregoing is the manner of reception data analysis.

Next, information collecting apparatus 300 relays the received control command to corresponding home electric appliance 200 (Step S406).

As has been described above, according to the present exemplary embodiment, the remote monitoring apparatus can optimally remotely control a home electric appliance based on the behavior (condition) of the resident in a housing unit. For example, an air conditioner can be controlled so as to prevent the resident from heat stroke or from stroke caused by sudden exposure to cold (for example, heat shock).

Note that, in the present exemplary embodiment, the description has been given of the case where home electric appliance 200 is remotely controlled to make the resident feel comfortable in the housing unit based on the analysis in Step S403. However, the present disclosure is not limited thereto. For example, a watch-over-resident function may be realized based on the analysis in Step S403. Specifically, with reference to FIGS. 5 and 6, for example, when a motion sensor value of level value 0 is continuously sensed for a prescribed period or more despite home electric appliance 200 continuously operating for a prescribed period, controller 120 apprehends that something is wrong with the resident. Then, controller 120 alerts the operator of remote monitoring apparatus 100 with an alarm or the like, and prompts the operator to check the condition of the resident. Thus, the watch-over-resident function can be realized.

Further, when sensor 220 senses abnormal temperatures, controller 120 may alarm the operator of remote monitoring apparatus 100 with an alarm or the like, and prompt the operator to check the condition of the housing unit and the home electric appliance.

Still further, when a motion sensor value of level value 0 is continuously sensed for a prescribed period or more during nighttime hours (for example, between time point 22:00 to time point 7:00), controller 120 may alert the operator of remote monitoring apparatus 100 with an alarm or the like, and prompt the operator to check the condition of the resident.

Still further, controller 120 may vary the alert level based on the user information of the attribute information stored in attribute information storage 150, for example the care level (care degree) that the resident needs. Here, the care level is preset information corresponding to the extent of care that the resident needs.

In the following, with reference to FIG. 7, a description will be given of a specific exemplary case where the alert level is varied based on the care level of the resident.

FIG. 7 is a table associating the user information and the alert level with each other.

Attribute information storage 150 stores the alert level in association with the user information.

As shown in FIG. 7, in the table associating the user information and the alert level with each other, names of residents or numbers of housing units (room numbers), and care levels are registered as the user information. Further, permissible sensing ranges being ranges of tolerated sensing values, and permissible sensing time being sensing time that is tolerated are registered as the alert level.

Note that, the care level shown in the table of FIG. 7 adopts the standard of Certification of Long-term Care Need enforced by Japanese Ministry of Health, Labour and Welfare.

Specifically, the standard of Certification of Long-term Care Need roughly classifies the care level into two levels, namely, Requiring Long-term Care and Requiring Support. Requiring Long-term Care is further broken down to five levels depending on the needs of care. For example, Requiring Long-term Care 5 is the state where support for living such as bathing, excretion, and eating, and support for household chores such as washing and cleaning are highly needed. It also refers to the state where measures against problematic behaviors such as wandering and unsanitary behavior and rehabilitation therapy for daily life such as walking are highly needed. Additionally, a person is certified as Requiring Long-term Care 5 when medical care is highly needed. On the other hand, a person is certified as Requiring Long-term Care 1 when such needs are low. A person is certified as Requiring Support when the person does not require long-term care but has difficulties in daily life.

Further, as the permissible sensing range, the permissible temperature range which is the indoor temperatures that the resident can tolerate is used. As the permissible sensing time, a tolerated response time to care after a motion sensor sensed an abnormality is used.

Next, a description will be given of the implementation and operation of the remote care system for an apartment building based on the care levels of residents, particularly of the analysis of the reception data in Step S403 in FIG. 4.

Firstly, controller 120 of remote monitoring apparatus 100 ascertains that an abnormality has occurred with the resident when, in the sensing information sensed by sensor 220 in Step S403, level value 0 of the motion sensor value continues for the permissible sensing time or longer. Alternatively, controller 120 ascertains that an abnormality has occurred with the housing unit or home electric appliance 200 when the indoor temperature, in the sensing information sensed by sensor 220, is outside the permissible temperature range.

Then, controller 120 alerts the operator of remote monitoring apparatus 100 with an alarm or the like, and prompts the operator to check the condition of the resident or the housing unit.

Specifically, for Mr./Ms. A who is the resident of Requiring Long-term Care 5 shown in FIG. 7, when level value 0 of the motion sensor value is continuously sensed for 10 minutes or more, controller 120 alerts the operator with an alarm or the like. Thus, controller 120 prompts the operator of remote monitoring apparatus 100 or the caregiver of the resident to take any action, such as checking the resident.

On the other hand, for Mr./Ms. B who is the resident of Requiring Long-term Care 2 capable of independently behaving to some extent, controller 120 alerts the operator or the caregiver with an alarm or the like when level value 0 of the motion sensor value is continuously sensed for 60 minutes or more. Thus, controller 120 prompts the operator of remote monitoring apparatus 100 or the caregiver to take any action, such as checking the resident.

In this manner, the operator of remote monitoring apparatus 100 or the caregiver can recognize the situation in short time and quickly take action for the resident of high care level. On the other hand, the operator or the caregiver is provided with temporal allowance in taking action for the resident of low care level. As a result, the burden on the operator of remote monitoring apparatus 100 and the caregiver can be reduced.

Further, in the table of FIG. 7 associating the user information and the alert level with each other, priorities are registered corresponding to the user information.

Now, a description will be given of the implementation and operation of the remote care system for an apartment building based on priorities.

Firstly, when it is necessary to alert the operator to the conditions of a plurality of residents simultaneously in Step S403 in FIG. 4, remote monitoring apparatus 100 preferentially alerts the operator to the condition of a higher-priority resident in accordance with the priorities stored in attribute information storage 150. This allows the operator of remote monitoring apparatus 100 and the caregiver to preferentially take action to a higher-priority resident, e.g., a resident of high care level. As a result, the burden on the operator of remote monitoring apparatus 100 and the caregiver can be reduced.

As has been described above, the remote care system can alert the operator of remote monitoring apparatus 100 according to, for example, the care level or priority of the resident of a housing unit. Thus, the resident can be supported under more proper watch.

Further, while the description has been given of the case where major appliances 200a, 200b, 200c, 200d as home electric appliances 200 are respectively installed in the housing units 1010, 1020, 1030, 1040 in the present exemplary embodiment, the present disclosure is not limited thereto. For example, a plurality of home electric appliances 200 may be arranged in one housing unit. This allows the operator of remote monitoring apparatus 100 to more closely monitor the condition of the resident based on the sensing information and the attribute information from the plurality of home electric appliances 200.

Still further, while the description has been given of the case where home electric appliance 200 is a major appliance, the present disclosure is not limited thereto. The remote care system for an apartment building may be structured using sensing information such as sensor information of, in addition to home electric appliance 200, for example, what is called an entertainment and information appliance such as a television set or a recorder. This makes it possible to more closely monitor the condition of the resident.

Second Exemplary Embodiment

In the following, a description will be given of a remote care system for an apartment building according to a second exemplary embodiment.

The remote care system for an apartment building according to the present exemplary embodiment is different from the first exemplary embodiment in that just home electric appliance 200 of a particular manufacturer is connected to and controlled by remote monitoring apparatus 100. The structure other than the basic control method is identical to that of the first exemplary embodiment and, therefore, a detailed description thereof will not be repeated.

In apartment building 1000, various home electric appliances 200 differing from each other in the manufacturer or in the model exist. In such a situation, it may be desired to make the resident feel comfortable by establishing connection between home electric appliance 200 of a particular manufacturer and remote monitoring apparatus 100. For example, the home electric appliance to be connected to remote monitoring apparatus 100 is specified to home electric appliance 200 of a particular manufacturer. This simplifies the communications protocol between the home electric appliance and remote monitoring apparatus 100. As a result, the remote care system for an apartment building can be implemented at low costs.

In the following, with reference to FIGS. 8 and 9, a description will be given of the procedure for connecting home electric appliance 200 of a particular manufacturer and remote monitoring apparatus 100 to each other.

FIG. 8 is a sequence diagram showing an initial stage of remote monitoring apparatus 100 determining the adaptability of home electric appliance 200.

As shown in FIG. 8, firstly, home electric appliance 200 transmits an application number to information collecting apparatus 300 (Step S701).

Next, information collecting apparatus 300 relays the received application number to remote monitoring apparatus 100 (Step S702).

Remote monitoring apparatus 100 having received the application number determines whether or not home electric appliance 200 is of a prescribed manufacturer, using the information on the manufacturer of home electric appliance 200 included in the application number (Step S703). Here, when it is determined that home electric appliance 200 is not of a prescribed manufacturer (No in Step S703), the procedure ends (Step S704).

On the other hand, when it is determined that home electric appliance 200 is of a prescribed manufacturer (Yes in Step S703), remote monitoring apparatus 100 transmits a prescribed authorization code to information collecting apparatus 300 (Step S705).

Next, information collecting apparatus 300 relays the received prescribed authorization code to corresponding home electric appliance 200 (Step S706).

Thus, home electric appliance 200 of a particular manufacturer is authenticated and connected to remote monitoring apparatus 100.

Next, with reference to FIG. 9, a description will be given of the operation of the authenticated particular home electric appliance 200 in the remote care system for an apartment building according to the present exemplary embodiment.

Note that, of the processes in FIG. 9, those similar to the processes in FIG. 4 are denoted by the same reference numerals and are briefly described. The processes not described with reference to FIG. 4 will be detailed in the following.

Firstly, home electric appliance 200 periodically transmits information to remote monitoring apparatus 100 via information collecting apparatus 300 (Steps S401 and S402). The information transmitted to remote monitoring apparatus 100 includes information sensed by sensor 220 (the presence or the condition such as movement of a person, the temperature and humidity inside the housing unit and the temperature outside the housing unit), setting information set to home electric appliance 200, and information such as an authorization code which is obtained through the procedure of FIG. 8.

Next, when remote monitoring apparatus 100 receives information on the authorization code from home electric appliance 200, controller 120 of remote monitoring apparatus 100 determines whether or not the authorization code is of a prescribed manufacturer (Step S801). When controller 120 determines that the authorization code is not of a prescribed manufacturer (No in Step S801), controller 120 repeats the determining operation.

On the other hand, when controller 120 determines that the authorization code is of a prescribed manufacturer (Yes in Step S801), controller 120 analyzes the reception data received from home electric appliance 200, as described in the first exemplary embodiment (Step S403).

Next, when the analysis of the reception data has completed, as shown in FIG. 9, controller 120 determines whether or not to transmit (issue) a control command to corresponding home electric appliance 200 (Step S404). When controller 120 does not transmit a control command (No in Step S404), control returns to Step S801 and the subsequent steps are executed.

On the other hand, when transmission of a control command is necessary (Yes in Step S404), controller 120 transmits a control command to corresponding home electric appliance 200 via information collecting apparatus 300 (Steps S405 and S406).

As described above, the remote care system for an apartment building according to the present exemplary embodiment can remotely control, with remote monitoring apparatus 100, just home electric appliance 200 of a specified manufacturer.

In the present exemplary embodiment, while the description has been given of the exemplary method for controlling home electric appliance 200 of a specified manufacturer, the present disclosure is not limited thereto. Home electric appliance 200 may be specified by any category other than manufacturers, for example, models, years of manufacture, performance and the like.

Note that, while the description has been exemplarily given of a remote care system for an apartment building in the exemplary embodiments, the present disclosure is not limited thereto. For example, the apartment building may include a row house structured by a plurality of individual households, a hospital having a plurality of rooms being housing units, or a care facility.

Further, while the description has been given of the exemplary structure in which sensor 220 is built in home electric appliance 200, the present disclosure is not limited thereto. For example, in addition to the built-in sensor 220, a second sensor may be separately provided.

In the following, with reference to FIG. 10, a description will be given of a specific structure of a remote care system for an apartment building that includes a separately provided second sensor.

Figure 10:
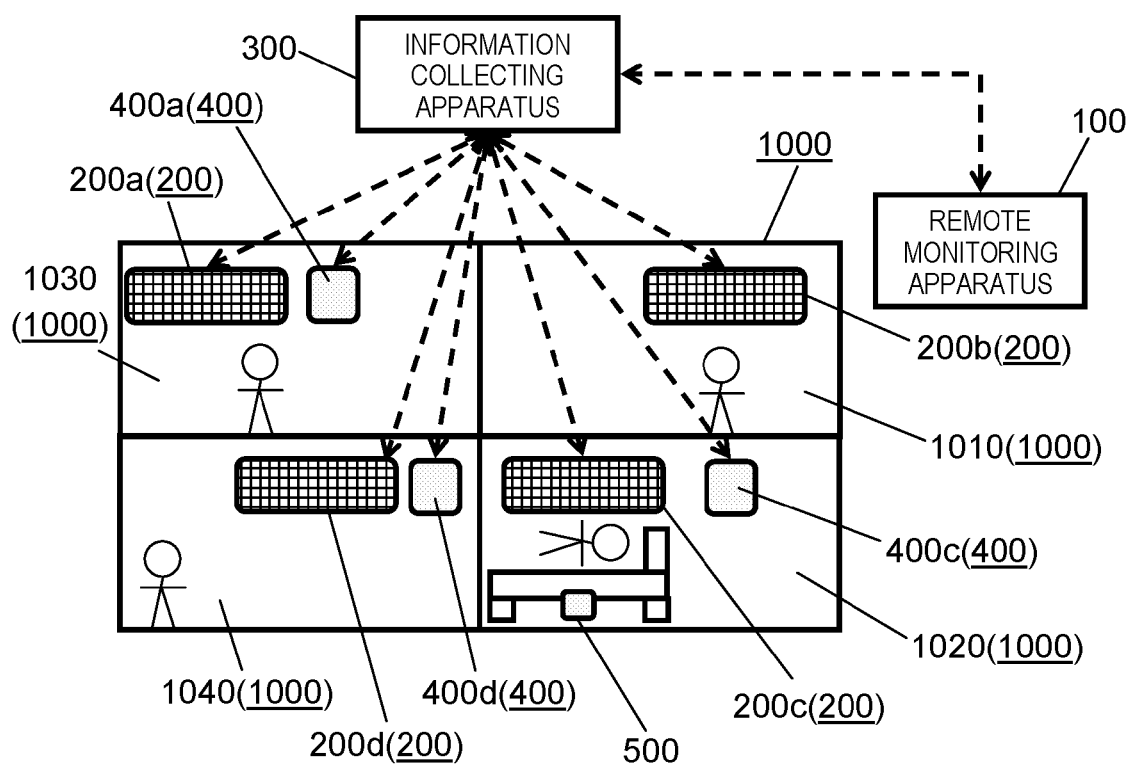
FIG. 10 is a diagram showing the overall structure of a remote care system for an apartment building according to variation of the embodiment of the present disclosure.

FIG. 10 is a diagram showing the overall structure of the remote care system for an apartment building according to variation of the exemplary embodiment.

As shown in FIG. 10, the remote care system for an apartment building according to variation includes second sensors 400 and second sensor 500 provided separately from home electric appliances 200.

Second sensors 400 are motion sensors respectively provided at upper parts in housing units 1010, 1020, 1030, 1040 (for example, at the ceilings). Each second sensor 400 may be, for example, an infrared sensor, an imaging camera, or an ultrasonic sensor. Here, the motion sensor being second sensor 400 desirably has higher performance than sensor 220 included in home electric appliance 200. Note that, in the remote care system for an apartment building shown in FIG. 10, for example, second sensors 400a, 400c, 400d are provided respectively corresponding to housing units 1020, 1030, 1040.

Further, second sensor 500 may be a pressure sensor provided in a bed in each of housing unit 1010, 1020, 1030, 1040. Note that, the remote care system for an apartment building shown in FIG. 10 shows the case where, for example, second sensor 500 is provided in housing unit 1020.

Firstly, second sensors 400 and second sensor 500 communicate with information collecting apparatus 300 to exchange various kinds of information. Note that, similarly to information collecting apparatus 300, the communication may be wired or wireless, and is not limited to a particular communication method.

Next, information collecting apparatus 300 communicate with remote monitoring apparatus 100 to transmit information including sensing information of second sensors 400 and second sensor 500.

Then, remote monitoring apparatus 100 analyzes the reception data including the sensing information of second sensors 400 and second sensor 500. Here, the analysis is carried out taking into consideration of the sensing information of second sensors 400 which have higher performance than sensors 220 built in the home electric appliances. This realizes more accurate remote control of home electric appliances 200 and watch-over-resident function based on the behavior (condition) of the residents in the housing unit. The analysis is further carried out taking into consideration of the sensing information of second sensor 500 such as a separately provided pressure sensor. Thus, for example, the sleeping state of the resident can be monitored. As a result, the optimum remote control of home electric appliance 200 and watch-over-resident function can be realized based on the sleeping state of the resident in the housing unit.

As has been described above, a remote care system for an apartment building of the present disclosure may include a home electric appliance installed in each of housing units structuring the apartment building, a sensor that is provided in the home electric appliance and senses the behavior of the resident in the housing unit, and a remote monitoring apparatus that remotely controls the home electric appliance installed in each of the housing units based on the sensing information transmitted from the sensor.

Thus, the person being watched over becomes less conscious of being monitored. As a result, a residential environment comfortable for the person being watched over can be provided.

Further, the remote monitoring apparatus of the remote care system for an apartment building of the present disclosure may remotely control the home electric appliance based on sensing information transmitted from the sensor and attribute information relating to the housing unit where the home electric appliance is installed.

Thus, even when the residents in the apartment building are in different environments, the home electric appliances can each be controlled optimally and comfortably for the corresponding resident in accordance with the environment of the resident.

Further, in the remote care system for an apartment building of the present disclosure, the attribute information may be information on a place where the home electric appliance is installed, and the remote monitoring apparatus may store the attribute information.

Thus, the home electric appliance can be controlled optimally and comfortably for the resident in accordance with the installation environment of the home electric appliance.

Further, in the remote care system for an apartment building of the present disclosure, the attribute information may be information on sunlight exposure of the housing unit, and the remote monitoring apparatus may store the attribute information.

Thus, the home electric appliance can be controlled optimally and comfortably for the resident in accordance with the sunlight exposure condition of the housing unit.

Further, in the remote care system for an apartment building of the present disclosure, the attribute information may be performance information of the home electric appliance installed in the housing unit, and the remote monitoring apparatus may store the attribute information.

Thus, the home electric appliance can be controlled optimally and comfortably for the resident in accordance with the performance of the home electric appliance.

Further, in the remote care system for an apartment building of the present disclosure, the attribute information may be information on the resident of the housing unit, and the remote monitoring apparatus may store the attribute information.

Thus, the home electric appliance can be controlled optimally and comfortably for the resident in accordance with the condition of the resident of the housing unit.

Further, in the remote care system for an apartment building of the present disclosure, the attribute information may be information of the sensor provided in the home electric appliance of the housing unit, and the remote monitoring apparatus may store the attribute information.

Thus, the home electric appliance can be controlled optimally and comfortably for the resident in accordance with the information of the sensor provided in the home electric appliance.

Further, the remote care system for an apartment building of the present disclosure further includes a second sensor that is installed in the housing unit structuring the apartment building and senses a condition of the resident in the housing unit. The remote monitoring apparatus may remotely control the home electric appliance installed in the housing unit based on the sensing information transmitted from each of the sensor and the second sensor.

Further, in the remote care system for an apartment building of the present disclosure, the home electric appliance may be provided with, as the attribute information, an authorization code that individually specifies the home electric appliance, and the remote monitoring apparatus may remotely control the specified home electric appliance based on the sensed authorization code.

Thus, control can be exerted over the home electric appliance specified to be connected to the remote monitoring apparatus. As a result, the remote care system for an apartment building can be implemented at low costs.

Further, a remote monitoring apparatus of a remote care system for an apartment building of the present disclosure may remotely control, based on sensing information transmitted from a sensor that is provided in a home electric appliance installed in a housing unit structuring an apartment building and that senses a condition of a resident in the housing unit, the home electric appliance installed in the housing units.

Thus, the person being watched over becomes less conscious of being monitored. As a result, a residential environment comfortable for the person being watched over can be provided.

What is claimed is:

1. A remote care system for an apartment building, the remote care system comprising:
   a home electric appliance installed in a housing unit structured in the apartment building;
   a sensor that is provided in the home electric appliance and adapted to sense conditions on a resident of the housing unit and output sensing information indicative of the conditions sensed on the resident, wherein the sensing information comprises motion information indicative of movement of the resident in the housing unit; and
   a remote monitoring apparatus that is provided remote from the housing unit, and adapted to receive the sensing information from the sensor and remotely control the home electric appliance based on the received sensing information,
   the remote monitoring apparatus further adapted to monitor the motion information from the sensor and upon a determination that the motion information indicates an alerting condition that the resident is inactive for a predetermined time, alert an operator of the remote monitoring apparatus of inactivity of the resident,
   wherein the remote monitoring apparatus is stored with attribute information on the resident comprising a care level thereof, and the predetermined time is shorter for a resident with a higher care level.

2. The remote care system for an apartment building according to claim 1, wherein the remote monitoring apparatus is storable with attribute information relating to the housing unit, where the home electric appliance is installed, and is adapted to remotely control the home electric appliance, based on the sensing information and the attribute information.

3. The remote care system for an apartment building according to claim 2, wherein
   the attribute information comprises information on a place in the housing unit where the home electric appliance is installed.

4. The remote care system for an apartment building according to claim 2, wherein
   the attribute information comprises information on a degree of sunlight exposure of a place in the housing unit, where the home electric appliance is installed.

5. The remote care system for an apartment building according to claim 2, wherein
   the attribute information comprises performance information of the home electric appliance installed in the housing unit.

6. The remote care system for an apartment building according to claim 2, wherein
   the attribute information comprises information on the resident of the housing unit.

7. The remote care system for an apartment building according to claim 2, wherein
   the attribute information comprises information on the sensor provided in the home electric appliance.

8. The remote care system for an apartment building according to claim 1, further comprising a second sensor that is installed in the housing unit and adapted to sense a condition on the resident of the housing unit other than movement of the resident and output second sensing information to the remote monitoring apparatus, wherein the remote monitoring apparatus is adapted to remotely control the home electric appliance installed in the housing unit, based on the sensing information from the sensor and the second sensing information from the second sensor.

9. The remote care system for an apartment building according to claim 2, wherein the attribute information comprises an authorization code provided to the home electric appliance and uniquely identifying the home electric appliance, and
   the remote monitoring apparatus is adapted to determine with the authorization code whether the home electric appliance is an authorized appliance and in response to a determination that the home electric appliance is authorized, remotely control the home electric appliance.

10. A remote monitoring apparatus used in a remote care system for an apartment building comprising multiple housing units therein, comprising:
    an input unit adapted to receive sensing information from a sensor provided in a home electric appliance installed in a housing unit, the sensing information being indicative of conditions on a resident of the housing unit and comprising motion information indicative of movement of the resident in the housing unit; and
    a controller adapted to remotely control the home electric appliance based on the received sensing information, the controller further adapted to monitor the motion information and upon determination that the motion information indicates an alerting condition that the resident is inactive for a predetermined time, alert an operator of the remote monitoring apparatus of inactivity of the resident,
    wherein the controller is stored with attribute information on the resident comprising a care level thereof, and the predetermined time is shorter for a resident with a higher care level.

11. The remote care system for an apartment building according to claim 1, wherein upon a determination that the motion information indicates the alerting condition, the remote monitoring apparatus is adapted to alert the operator that the resident may be in trouble.

12. The remote care system for an apartment building according to claim 1, wherein upon a determination during a night time that the motion information indicates the alerting condition, the remote monitoring apparatus is adapted to alert the operator that the resident may be in trouble.

13. The remote care system for an apartment building according to claim 11, wherein the remote monitoring apparatus is adapted to alert the operator at a different alert level selected according to the care level of the resident.

14. The remote care system for an apartment building according to claim 13, wherein the remote monitoring apparatus is stored with information relating multiple alert levels, respectively, to different care levels.

15. The remote care system for an apartment building according to claim 1, further comprising a plurality of sensors provided, respectively, in a plurality of housing units structured in the apartment building, the plurality of sensors being adapted to sense conditions, respectively, on the residents of the respective housing units and output a plurality of sets of motion information indicative, respectively, of movements of the residents in the housing units,
- wherein the remote monitoring apparatus is stored with attribute information on each resident comprising a care level thereof and adapted to receive and monitor the plurality of sets of motion information from the plurality of sensors, and
- wherein upon determination that some sets of motion information simultaneously indicate alerting conditions of different residents, the remote monitoring apparatus is adapted alert the operator of the monitoring apparatus with a higher priority given to a resident of the different residents with a higher care level.

* * * * *